No. 649,911. Patented May 22, 1900.
E. BYARS.
BALING PRESS.
(Application filed Dec. 26, 1899.)
(No Model.) 3 Sheets—Sheet 2.
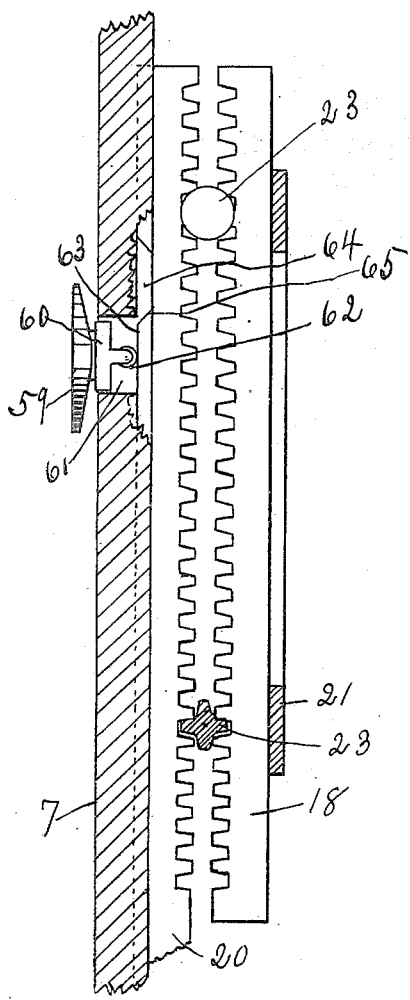
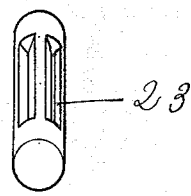
WITNESSES:
B. F. Bouldin
J. M. M. Thirshead
INVENTOR,
Edgar Byars,
BY
A. L. Jackson
ATTORNEY.

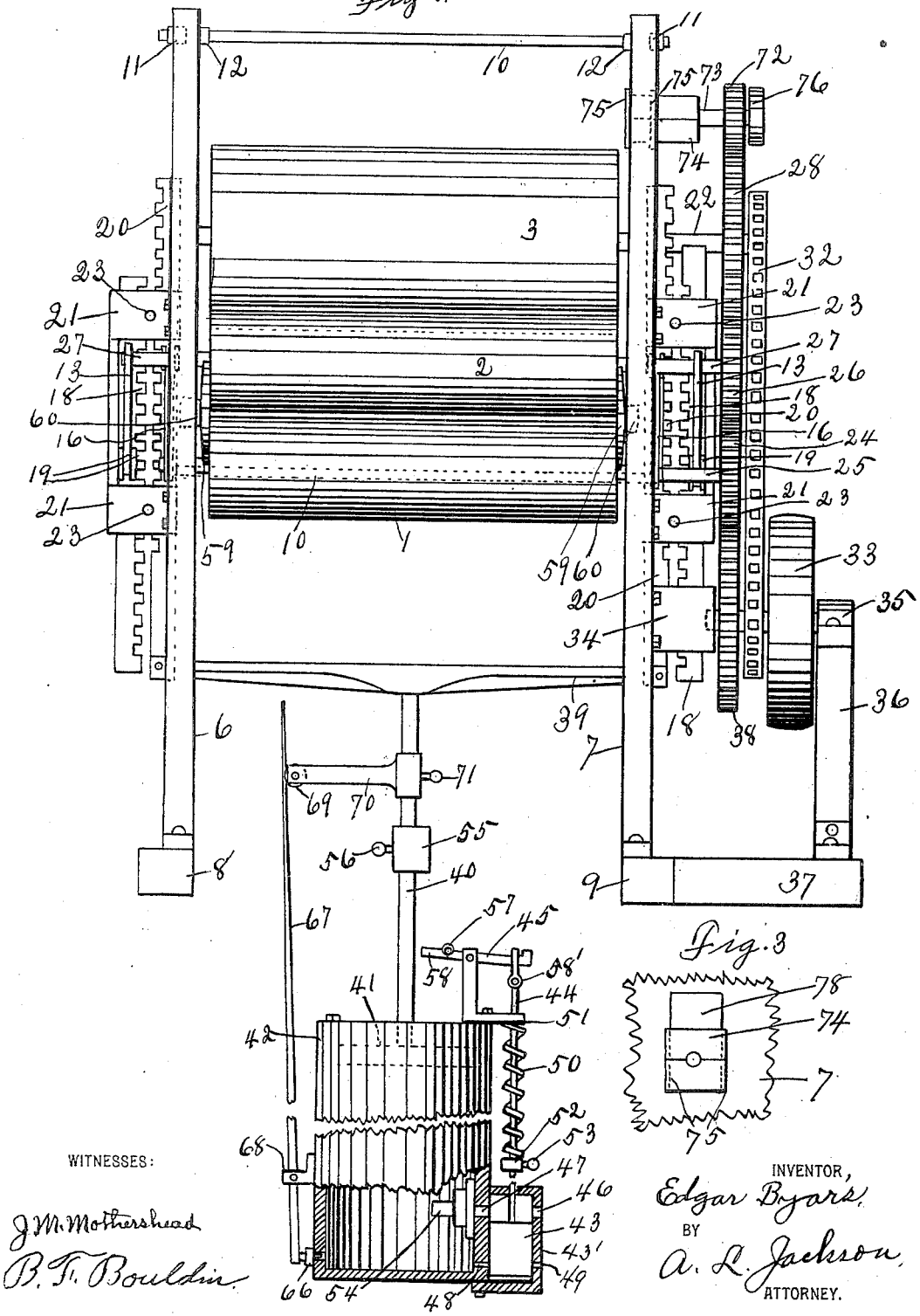

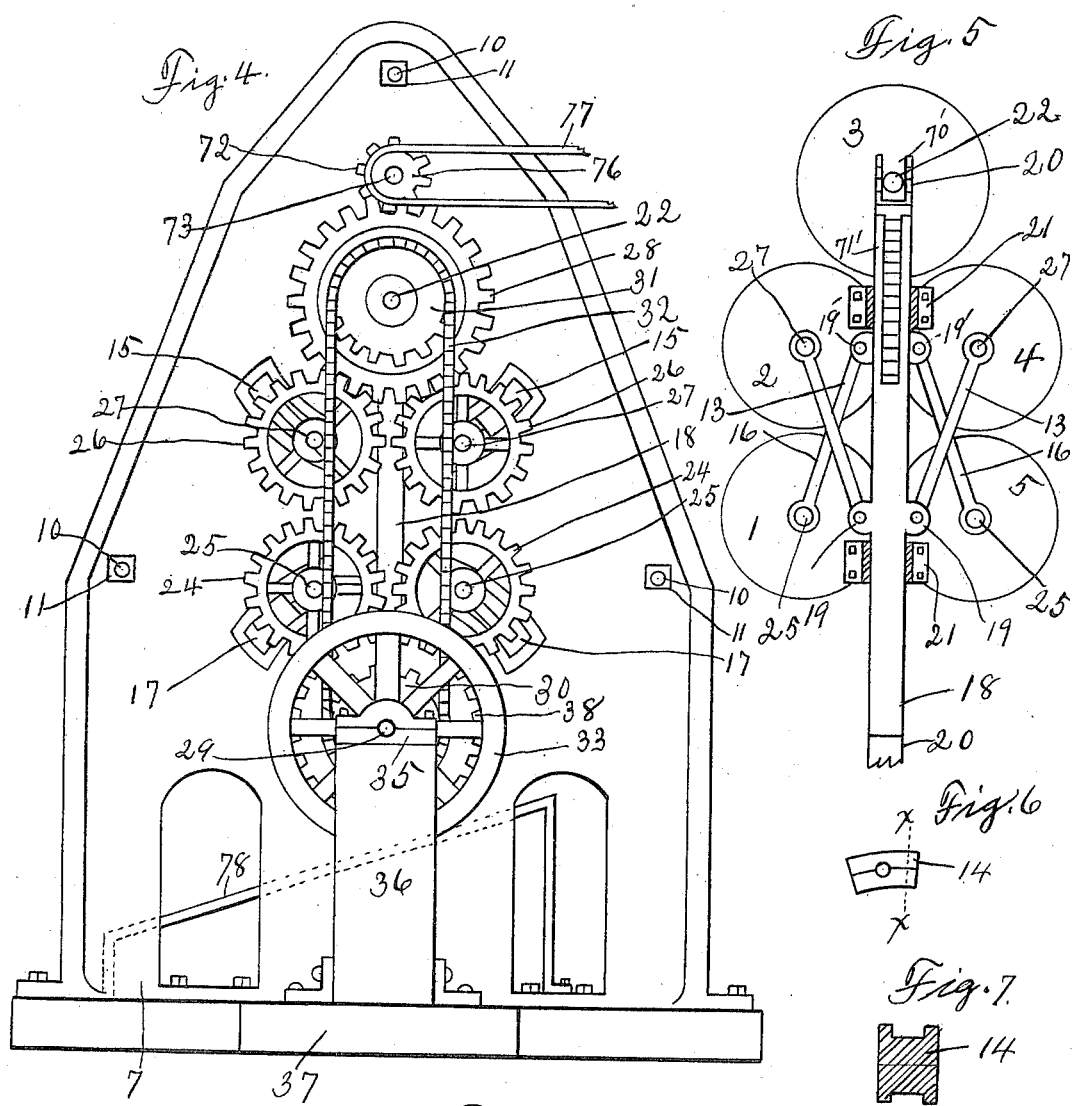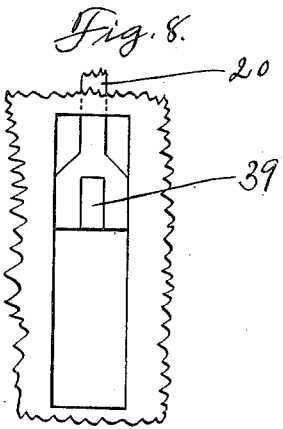

UNITED STATES PATENT OFFICE.

EDGAR BYARS, OF RHOME, TEXAS.

BALING-PRESS.

SPECIFICATION forming part of Letters Patent No. 649,911, dated May 22, 1900.

Application filed December 26, 1899. Serial No. 741,515. (No model.)

*To all whom it may concern:*

Be it known that I, EDGAR BYARS, a citizen of the United States, residing at Rhome, Texas, have invented certain new and useful Improvements in Baling-Presses, of which the following is a specification.

My invention relates to presses for making cylindrical bales of cotton and similar material, and more particularly to presses for receiving and rolling the material in a continuous sheet or bat to form the bale as the material comes from a condenser and which will exert uniformly-increasing pressure on the bale from the commencement of the formation of the bale until the bale is completed.

Other objects and advantages will be understood from the following description when read in connection with the accompanying drawings.

The invention will be more particularly pointed out in the claims.

Reference is had to the accompanying drawings, which form a part of this application.

Figure 1 is a front elevation of the baling-press, showing the steam-cylinder broken and partly in section. Fig. 2 is a broken sectional detail view of the friction-racks. Fig. 3 is a broken view of the press-frame, illustrating a sliding box. Fig. 4 is an end elevation of the press. Fig. 5 is a diagrammatic view of the compression-rollers and the swinging arms. Fig. 6 illustrates one of the sliding boxes for mounting the compression-rollers. Fig. 7 is a cross-section of the box shown in Fig. 6 along the line $x\ x$. Fig. 8 is a broken view of one side of the frame, showing the guideway for the beam, which is mounted on the piston-rod. Fig. 9 is a detail perspective view of the fluted roller.

Similar characters of reference are used to indicate the same parts throughout the several views.

The bale is formed between compression-rollers 1, 2, 3, 4, and 5, mounted in a frame composed of two upright castings 6 and 7, mounted on sills 8 and 9. The castings 6 and 7 are braced at the top and sides by means of rods 10. These rods and the frame-pieces 6 and 7 are secured by nuts 11 on the outside of the frame and nuts 12 on the inside thereof. The rod 10 in front of roller 1 is omitted in Fig. 1, but indicated by dotted lines.

The frame-pieces are bolted to the sills. Compression-roller 3 by passing and compressing the material between it and one of the rollers 2 or 4 ready to be baled acts as a feed-roller and is mounted in stationary bearings. Rollers 2 and 4 are mounted in swinging arms 13 and in bearings 14, which slide in the curved slots 15 in the frame. The rollers 1 and 5 are mounted in the swinging arms 16 and in bearings 14, which slide in the curved slots 17 in the frame. The swinging arms 13 are pivotally connected to the sliding rack 18, this rack having ears 19 projecting from the sides thereof for this purpose. Swinging arms 16 are also pivotally connected to sliding rack 20 at 19' 19'. Racks 18 and 20 are friction-racks and are mounted in the frame by means of brackets 21, which are bolted to the frame. Both racks 18 and 20, on the right-hand side of the press, are bifurcated at their upper ends, as at 70' and 71', so that they will not come in contact with the shaft 22 of roller 3. It may not always be necessary for the rack 20 to extend as high up as the shaft 22. Fluted rollers 23 are mounted between the sliding racks 18 and 20 and are journaled in the brackets 21.

The compression-rollers are driven by spur-gearing. Wheels 24 are mounted on shafts 25 of rollers 1 and 5. Wheels 26 mesh with a wheel 28, mounted on shaft 22. Wheels 24 mesh with a wheel 38, mounted on shaft 29. A sprocket-wheel 30 is mounted on shaft 29, and a sprocket-wheel 31 is mounted on shaft 22. A sprocket-chain 32 is mounted on sprocket-wheels 30 and 31. Shaft 29 is driven by a drive-wheel 33, mounted on shaft 29. Shaft 29 has a bearing at one end in the bracket 34, which is bolted to the frame-piece 7, and a bearing 35 at the other end, mounted on the support 36, which is bolted to a sill 37. Drive-wheel 33 is to be driven by any suitable motive power. From this description it will be seen that the driving of shaft 29 will drive gear-wheel 38 and that wheel 38 will drive gear-wheels 24, and thus drive rollers 1 and 5, and that shaft 29 will drive sprocket-wheel 30, and that sprocket-wheel 30, with sprocket-chain 32, will drive sprocket-wheel 31 and shaft 22. This operation will drive gear-wheel 28 and roller 3. Gear-wheel 28 will drive wheels 26 and rollers 2 and 4.

Cotton is fed to the press between the roller 3 and roller 2 or 4, and the bale is formed between the rollers 2 and 4 and 1 and 5.

Means are provided for allowing the rollers to recede during the formation of the bale. The rollers have bearings which move in the curved slots in the frame above described and recede as the bale is forming. Means are provided for resisting the receding motion of the rollers. Compression-rollers 2, 4, 5, and 1 are mounted in swinging arms, as above described, and the swinging arms are connected to friction-racks 18 and 20. Friction-racks 20 have extensions of the bars on which the racks are formed. These extensions engage a cross-beam 39, as shown in Fig. 1. The downward motion of this bar or beam is resisted by steam-pressure or hydraulic pressure. A piston-rod 40 is connected to this beam 39 and has a piston 41, operating in a cylinder 42. Steam is let in this cylinder and automatically exhausted, as will hereinafter appear. A valve-box 43' is attached to the cylinder and a valve 43 is mounted in this box. The valve has a stem 44, which projects out of the valve-box and engages a lever 45. Steam is admitted to the cylinder through an aperture 46 in the valve-box and an aperture 47 in the cylinder, and the steam is exhausted by means of the apertures 48 and 49. A pipe may be used to connect the aperture 46 with a steam-supply source. The valve 43 is held in position to keep the inlet-apertures 46 and 47 open by means of the spiral spring 50, which is mounted on the valve-stem 44. The stem operates in a guide-bracket 51. A button or bead 52 is secured to the stem by means of a set-screw 53, against which and the bracket 51 the spring 50 bears. This spring keeps the valve pressed beyond the intake. Steam will be received in the cylinder until the pressure in the cylinder becomes as great as the pressure from the supply source. When the downward pressure on the piston, due to the increasing size of the bale, becomes greater than the steam-pressure in the cylinder, the steam is prevented from going back out through the aperture 47 by means of the check-valve 54, which is a simple form of flap-valve which opens inwardly. The exhaust is opened automatically just as the bale is completed. The receding motion of the rollers will cause racks 20 to move toward the steam-cylinder and the racks 18 to move in the opposite direction. The motion of the racks 20 will be resisted by the steam-pressure in the cylinder, and the racks 18 can move only as racks 20 move by reason of the fact that these racks operate on the fluted rollers 23. A lug 55 is secured to the piston-rod 40. As the bale is increasing in size the lug 55 is approaching the tripping-lever 45, and the lug is set so that it will trip the lever just as the bale is completed. This operation will cause the stem 44 to cut off the steam and open the exhaust. Means (hereinafter described) are provided for releasing the completed bale just as the exhaust is opened. This will relieve the pressure. The spiral spring 50 will close the exhaust and permit the steam to enter the cylinder and force the piston upward. This operation will replace the rollers to commence a new bale. The lug 55 will not move the valve-stem in repassing, because the lever 45 is jointed at 57. The part 58 of the lever will be raised to let the lug pass, and then it will fall back to its place. The valve-stem is jointed at 58', so that this stem will not bind in the guide-bracket as it is being operated by the lever 45.

Means are provided for releasing the bale at the moment it is completed, so that it will drop and roll out of the press. The bale is formed between two disks 59. These disks are mounted on blocks 60. Recesses 61 are made in the frame-pieces for these blocks. Small trolley-wheels 62 are mounted in blocks 60 and run on ribs 63, which are made on the backs of the friction-racks 20. Grooves 64 are made in the frame-pieces 6 and 7 for these ribs. In order that the disks may release the bale when it is complete, provision is made to let the disks open wider apart. The ribs 63 have cut-outs 65 therein, so that the trolley-wheels 62 may move back against the backs of the racks 20. The cut-outs 65 are made in the ribs 63 just at the points in the ribs which will be even with or adjacent to the trolley-wheels 62 at the moment the bale is completed.

The steam-cylinder is provided with a safety-valve 66. This valve is attached to a tapering steel spring 67. This spring is pivotally mounted in a bracket 68, which may be attached to the steam-cylinder. The spring 67 presses against a trolley-wheel 69, mounted in an arm 70. This arm is adjustably mounted on the piston-rod 40 by means of a set-screw 71. The spring 67 is set at an angle to the cylinder 42, so that it will exert increasing pressure on the valve as the steam-pressure becomes greater in the cylinder owing to the downward movement of the piston; but should the steam-pressure become too great it will yield to permit the valve to open.

Means are provided for driving a condenser with the motive power and driving-gear that are used in driving the compression-rollers, so that the condenser may be stopped at the moment the rollers stop. A spur gear-wheel 72, which meshes with wheel 28, is mounted on a shaft 73, which has a sliding bearing 74 mounted in the frame-piece 7. This box has flanges 75, which hold the box in place during its up-and-down motion. A pulley-wheel 76 is mounted on shaft 73, which may drive a belt 77, leading to the condenser. The stopping of the condenser is done automatically. Just as a bale is being completed the rack 18 on that side of the press comes in contact with the box 74 and shoves it upward. This takes the wheel out of mesh with wheel 28, and not being driven by any other power the wheel 72 will stop and the condenser will stop. As soon as the bale is released, as above described, the racks 18 move downward and let the wheel 72 back in mesh with wheel 28, and thus start the condenser. A slot 78 is made in the frame-piece 7 for the box or bearing 74. Guideways or slots are made in the frame-pieces 6 and 7 for the ends of beam 39, which is attached to the piston-rod. One of these guideways is shown in Fig. 8. The guideways guide the beam 39 and the piston-rod 40.

The operation may be briefly described as follows: Material is fed to the press between the roller 3 and either roller 2 or 4. This prepares the sheet or bat which is coming from a condenser for rolling between the rollers 2 and 4 and 1 and 5. These rollers are forced to recede as the bale increases in size and as they recede they follow the curved slots in the frame. The receding motion is retarded by steam-pressure, as above described, applied by means of the swinging arms and friction-racks, above described, friction-racks 20 moving downward gradually and friction-racks 18 moving upward gradually. Racks 18 will stop the condenser as soon as the bale is complete. At the same time the disks 59 will release the bale. At the same time the steam-supply is cut off and the exhaust is opened. The lug 55 is elongated so that the steam-supply will be cut off long enough and the exhaust held open long enough to separate the rollers 1 and 5 wide enough for the bale to pass between these rollers and drop on the chute 78 and roll out of the press. Immediately after the lug 55 passes the lever-arm 58 the steam is turned in the cylinder and the exhaust is closed, beam 39 rises, the rollers are replaced, the disks are replaced, and connection is made for driving the condenser. It is not necessary to stop the rotation of the rollers for the removal of the bale and to rearrange the press for a new bale, as these operations are accomplished automatically.

Various changes may be made in the construction of a press of the character described without departing from this invention. It is obvious that the press can be set up in a horizontal position as well as in an upright position, as illustrated.

Having fully described my invention, what I claim as new, and desire to secure by Letters Patent, is—

1. A baling-press for making cylindrical bales having a suitable frame, compression-rollers mounted in said frame, means for resisting the receding motion of said rollers, driving mechanism having operative connection with the press for driving a condenser, means for removal of the bale and replacing the rollers for a new bale automatically, means for automatically disconnecting and connecting the driving mechanism for the condenser, and means for driving the rollers whereby as the press is started and stopped it will automatically control the supply of material to the press.

2. A baling-press for making cylindrical bales having a suitable frame, compression-rollers mounted in said frame, means for driving said rollers, means for resisting the receding motion of said rollers, said means consisting of a pair of friction-racks mounted on each end of said press, swinging arms engaging the shafts of said rollers and pivotally attached to said racks, a steam-cylinder provided with a piston and piston-rod, and means for connecting said piston-rod to the inner rack of each of said pairs of racks, and means for causing the inner racks and the outer racks of each pair of racks to move in opposite directions.

3. A baling-press for making cylindrical bales having a suitable frame, compression-rollers mounted in said frame, means for controlling the receding motion of said rollers, means for utilizing the receding motion of said rollers to disconnect the controlling means when the bale is complete, means for automatically connecting the controlling means when a bale has been released, and means for rotating the rollers.

4. A baling-press for making cylindrical bales having a suitable frame, compression-rollers mounted in said frame, means steam-controlled to resist the receding motion of said rollers, means for utilizing the receding motion of said rollers to disconnect the steam-controlled means when the bale is complete, means for automatically connecting the steam-controlled means when the bale has been released, and means for automatically stopping and starting the feeding of said rollers.

5. A baling-press for making cylindrical bales having a suitable frame, compression-rollers mounted in said frame, means steam-controlled to resist the receding motion of said rollers, means for utilizing the receding motion of said rollers to disconnect the steam-controlled means and release the bale when the bale has been completed, and means for rotating the rollers.

6. A baling-press for making cylindrical bales having a suitable frame, compression-rollers mounted in said frame, curved slots in said frame for the receding motion of said rollers, friction-racks mounted on each end of said frame and arranged in pairs, yokes or brackets bolted to said frame for holding said racks in place, fluted rollers journaled in said yokes whereby the movement of the inner racks of each pair will cause the outer racks to move in the opposite direction, swinging arms engaging the shafts of said rollers and pivotally attached to said racks, and means for applying steam-power to said inner racks to resist the receding motion of said rollers.

7. A baling-press for making cylindrical bales having a suitable frame, compression-rollers mounted in said frame, sliding bearing for said rollers adapted to move in curved slots in said frame, sliding friction-racks mounted in pairs on each end of said frame, swinging arms engaging the shafts of said rollers and pivotally connected to said racks, means for applying steam-power to said racks to resist the receding motion of said rollers, and means holding said racks in place consisting of ribs on the backs of the inner racks operating in grooves in said frame, yokes bolted to said frame, and fluted rollers between the racks of each pair journaled in said yokes whereby moving the inner racks will cause the outer racks to move in the opposite direction.

8. A baling-press for making cylindrical bales having a suitable frame, compression-rollers mounted in said frame, means for resisting the receding motion of said rollers consisting of sliding racks arranged in pairs on each end of the press, swinging arms engaging the shafts of said rollers and pivotally attached to said racks, the inner racks of said pairs of racks having ribs projecting in grooves in the press-frame, yokes bolted to said frame for holding said racks in place, fluted rollers mounted between the racks of each pair and journaled in said yokes, and means for applying steam-power to said racks; and blocks bearing disks for forming smooth ends of the bales, said blocks operating in recesses in said frame and having trolley-wheels mounted therein and running on the ribs of said racks, said ribs having cut-outs whereby said disks are permitted to move away from the bale just as the bale is completed.

In testimony whereof I set my hand, in the presence of two witnesses, this 5th day of December, 1899.

EDGAR BYARS.

Witnesses:
A. L. JACKSON,
J. M. MOTHERSHEAD.